United States Patent [19]

Hansson

[11] Patent Number: 4,834,192
[45] Date of Patent: May 30, 1989

[54] TWO-SPEED POWER TOOL

[75] Inventor: Gunnar C. Hansson, Stockholm, Sweden

[73] Assignee: Atlas Copco Aktiebolag, Nacka, Sweden

[21] Appl. No.: 63,587

[22] Filed: Jun. 17, 1987

[30] Foreign Application Priority Data

Jun. 24, 1986 [SE] Sweden ............................ 8602791

[51] Int. Cl.$^4$ ............................................. B25B 23/14
[52] U.S. Cl. ....................................... 173/12; 81/476; 74/674
[58] Field of Search ................ 173/12; 81/467, 473, 81/476; 74/674, 682, 705; 192/56 R

[56] References Cited

U.S. PATENT DOCUMENTS

| 3,610,343 | 10/1975 | Bratt | 173/12 |
| 4,215,594 | 8/1980 | Workman, Jr. et al. | 173/12 X |
| 4,513,827 | 4/1985 | Dubiel | 173/12 |
| 4,650,007 | 3/1987 | Fujita et al. | 173/12 |

Primary Examiner—Douglas D. Watts
Assistant Examiner—James L. Wolfe
Attorney, Agent, or Firm—Frishauf, Holtz, Goodman & Woodward

[57] ABSTRACT

A two-speed power tool having a rotation motor supported in a housing (10) and driving an output spindle via three planetary reduction gears (13, 25, 22). The ring gear (17) of a first planetary gear (13) is rotatable relative to the housing (10) as well as axially displaceable between a high speed position and a low speed position. A friction coupling (37) is associated with the housing (10) and the ring gear (17) of the first planetary gear (13) to lock the latter against rotation either relative to the planet wheel carrier (16) of the first planetary gear (13) when occupying its high speed position or relative to the housing (10) when occupying its low speed position. The ring gear (22) of a second planetary gear (19) which is located after the first planetary gear (13) is rotatable relative to the housing (10) and cooperates with a cam (40, 41) to shift the first planetary gear ring gear (17) against the action of a spring (32) from the high speed position to a low speed position as a certain reaction torque threshold level in the second planetary gear ring gear (22) is exceeded. The cam (40, 41) also provides a torque responsive release function which comes into operation at a reaction torque level corresponding to the desired maximum output torque of the tool.

13 Claims, 1 Drawing Sheet

TWO-SPEED POWER TOOL

BACKGROUND OF THE INVENTION

This invention relates to a two speed power tool. In particular the invention concerns a tool of this type comprising a housing, a rotation motor mounted in said housing, an output spindle, at least two planetary reduction gears located between said motor and said output spindle, the ring gear of a first planetary gear is rotatable relative to said housing as well as axially displaceable between a high speed position and a low speed position, and a coupling means associated with said housing and said first planetary ring gear to lock the latter against rotation either relative to the planet wheel carrier of said first planetary gear when occupying its high speed position or relative to said housing when occupying its low speed position.

A power tool of this type is previously described in U.S. Pat. No. 3,610,343. In this known tool shifting of a planetary gear ring gear between a low speed position and a high speed position is accomplished by a pneumatically actuated piston the operation of which is controlled by a valve system. This control valve system operates in response to the back pressure from the motor such that when the back pressure reaches a certain level pressure air is supplied to the pneumatic cylinder and the gear ring is shifted from its high speed position to its low speed position.

The main object of the present invention is to create an improved two-speed power tool in which the ring gear of a planetary gear is automatically shifted by a cam means from a high speed position to a low speed position and which does not involve any valve means for controlling the shifting of the ring gear.

DETAILED DESCRIPTION

Figure 1:
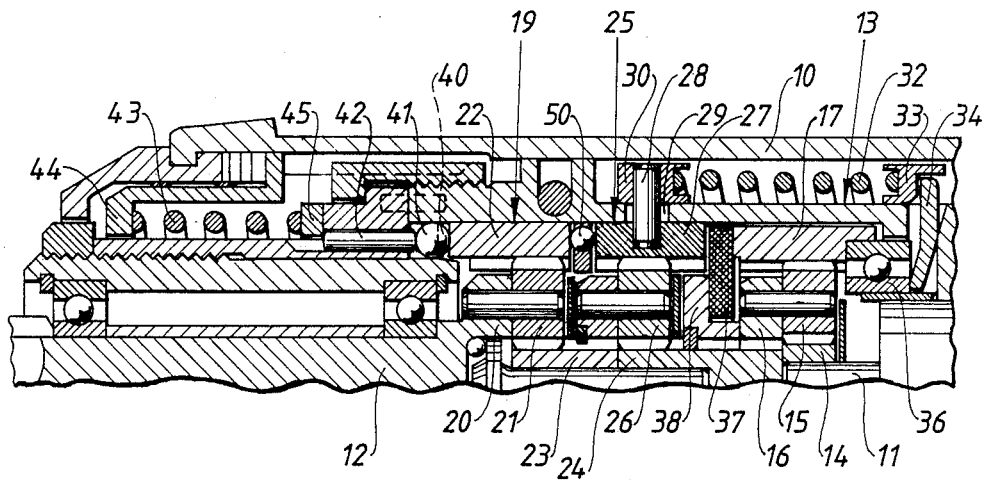
FIG. 1 shows a longitudinal section through a power tool according to the invention.

The tool shown on the drawing is intended for screw joint tightening purposes and comprises a housing 10, a rotation motor (not shown) mounted in the housing 10 and rotating a drive shaft 11. A three stage reduction gearing interconnects the drive shaft 11 and a driven shaft 12. The reduction gearing comprises three planetary reduction gears arranged in series. A first one 13 of said reduction gears comprises a sungear 14, a number of planet wheels 15, a planet wheel carrier 16 and a ring gear 17. The sun gear 14 is attached to the drive shaft 11. A second planetary gear 19 is the last one of the three planetary gears and comprises a plant wheel carrier 20 which is formed in one piece with the driven shaft 12. The planet gear 19 also comprises a number of planet wheels 21, a ring gear 22 and a sun gear 23. The latter is directly connected with a planet wheel carrier of a third, intermediate planetary gear 25. This intermediate planetary gear 25 also comprises a number of planet wheels 26, a ring gear 27 and a sun gear 24 which is integrated with the planet wheel carrier 16 of the first planetary gear 13.

The ring gears 17, 22, 27 of all three planetary gears 13, 19 and 25, respectively, are axially displaceable relative to the housing 10. The ring gear 17 of the first planetary gear 13 and the ring gear 22 of the second planetary gear 19 are both rotatably supported in the housing, whereas the ring gear 27 of the intermediate planetary gear 25 is locked against rotation by radial pins 28 extending through openings 29 in the housing. The radial pins 28 are attached to a ring 30 which is movably supported on the outside of the housing 10. A spring 32 takes support against the ring 30 at its one end and against another ring 33 at its opposite end. The ring 33 rests axially against one end of double armed levers 34 which at their midpoints are supported by the housing and which at their opposite ends rest against a ball bearing 36. The latter is firmly attached to and transfers an axial bias force to the ring gear 17. At its left hand end the ring gear 17 rests against a friction ring 37 which in turn rests against a flange 38 rigidly mounted on the planet wheel carrier 16. The friction ring 37 may have either even contact surfaces or ratchet teeth for torque transmission.

Figure 2:
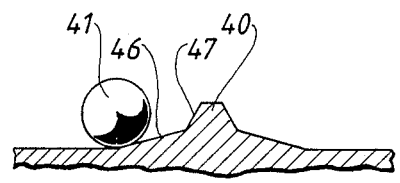
FIG. 2 illustrates schematically the cam means of the tool in FIG. 1.

The ring gear 22 of the second planetary gear 19 is at its left hand end surface formed with axially projecting cams 40 which are arranged to be engaged by balls 41. The latters are supported by axially extending pins 42 and a pretensioned compression ring 43. The latter acts between an axially adjustable sleeve 44 and a ring element 45 which is supported by a shoulder in the housing 10. A thrust ball bearing 50 is located between the ring gear 22 and the ring gear 27 to minimize the friction forces on the ring gear 22 during its gear shifting and release movements. The cams 40 are symmetrical and comprise on each side a first cam surface 46 of a relatively moderate inclination and a second cam surface 47 of a steeper inclination. See FIG. 2.

In operation of the tool, during the running down sequence of the screw joint to be tightened and when the frictional resistance from the screw joint is very low the cam following balls 41 have no tendency to move along the first cam surfaces 46 of the cams 40, because the axial bias load exerted by spring 32 via the pins 28, the ring gear 27 and the ball bearing 50 to the gear ring 22 is still strong enough to prevent axial movement of the latter. This means that as long as the frictional resistance in the screw joint to be tightened is below a certain level, the cam following balls 41 in their cooperation with the first cam surfaces 46 accomplish a brake force on the ring gear 22, a brake force that is strong enough to prevent the ring gear 22 from rotating. The spring 32 also exerts an axial bias force on ring gear 17 via the level means 34 and the ball bearing 36, which means that the ring gear 17 is thrusted against the friction ring 37 and the flange 38 of the planet wheel carrier 16. This means that when the load on the output shaft of the tool is below a certain level the ring gear 17 of the first planetary gear 13 is frictionally locked to the planet wheel carrier 16 and rotates together with an at the same speed as the latter. This means in turn that the first planetary gear 13 is not active to reduce speed and that a high speed operation of the tool is accomplished. As the frictional resistance in the screw joint increases above a certain level the cam following balls 41 are moved along the first cam surfaces 46, thereby causing the ring gear 22, the axial thrust bearing 50 and ring gear 27 to move axially. This results in the friction ring 37 being clamped between the ring gear 27 of the intermediate planetary gear 25 and the ring gear 17 of the first planetary gear 13, and that the clamping force of the frictional ring 37 relative to the flange 38 of the planet wheel carrier 16 ceases. Instead, the ring gear 17 is now locked against rotation relative to the housing 10. The low speed position of the ring gear 17 is now obtained.

So far the cam following balls 41, the pins 42 and the spring 43 have not been displaced at all. When, however, the torque resistance from the screw joint exceeds a predetermined maximum level the balls 41 start moving along the steep cam surfaces 47 of the cams 40 against the bias force exerted by the spring 43, and when the balls 41 reach and pass over the tops of the cams 40 the power transmission is discontinued. The maximum torque level at which this release function comes into operation is determined by the degree of pretension of the spring 43 at a given inclination angle of the cam surfaces 47. The degree of pretension of spring 43 may be set by adjusting the sleeve 44 relative to the housing.

The invention is illustrated by way of the above description of a screw joint tightening tool, but might as well be applied on other types of tools like drilling machines. In particular the invention may find its use at battery powered drilling machines the performance of which may be considerably improved by the invention.

I claim:

1. A two-speed power tool comprising:
a housing (10);
a rotation motor mounted in said housing (10);
an output spindle (12);
at least two planetary reduction gears (13, 19) arranged in series and located between said motor and said output spindle (12);
a first of said planetary reduction gears (13) comprising a ring gear (17) which is rotatable relative to said housing (10), as well as axially displaceable between a high speed position and a low speed position;
a friction coupling (37) associated with said housing and said first planetary gear ring gear (17) for locking said first planetary gear ring gear (17) against rotation either relative to a planet wheel carrier (16) of said first planetary gear (13) when said first planetary gear ring gear occupies a high speed position or relative to said housing (10) when said first planetary gear ring gear occupies a low speed position;
a second of said planetary gears (19) located after said first planetary gear (13) and comprising a ring gear (22) which is rotatable as well as axially displaceable relative to said housing (10); and
cam means (40, 41) associated with said second planetary gear ring (22) for displacing axially the latter, for activating said friction coupling (37), and for thereby shifting said first planetary gear ring gear (17) from said high speed position to said low speed position responsive to a predetermined reaction torque threshold level in said second planetary gear ring gear (22) being exceeded.

2. Tool according to claim 1, comprising first spring means (32) for exerting an axial bias force on said first planetary gear ring gear (17) toward said high speed position of said first planetary gear ring gear 17, and wherein said cam means (40, 41) is arranged to shift said first planetary gear ring gear (17) toward said low speed position against the action of said first spring means (32).

3. Tool according to claim 2, wherein said coupling means (37) comprises a friction element which in said high speed position of said first planetary gear ring gear (17) is clamped between said first planetary gear ring gear (17) and the planet wheel carrier (16) of said first planetary gear (13) and which in said low speed position of said first planetary gear ring gear (17) is clamped between said first planetary gear ring gear (17) and an element (27) which is non-rotatively supported in said housing (10).

4. Tool according to claim 3, wherein said element (27) is formed by a ring gear (27) of a third planetary gear (25) which is located between said first planetary gear (13) and said second planetary gear (19), and said ring gear (27) of said third planetary gear (25) being axially displaceable together with said second planetary gear ring gear (22) under the influence of said cam means (40, 41).

5. Tool according to claim 4, wherein said cam means (40, 41) comprises a release clutch means (40, 47) for transferring a reaction torque from said second planetary gear ring gear (22) to said housing (10) only as long as the reaction torque on said second planetary gear ring gear (22) does not exceed a limit value which is higher than said threshold level and which corresponds to a desired maximum torque to be delivered by the tool.

6. Tool according to claim 3, wherein said cam means (40, 41) comprises a release clutch means (40, 47) for transferring a reaction torque from said second planetary gear ring gear (22) to said housing (10) only as long as the reaction torque on said second planetary gear ring gear (22) does not exceed a limit value which is higher than said threshold level and which corresponds to a desired maximum torque to be delivered by the tool.

7. Tool according to claim 2, wherein said cam means (40, 41) comprises a release clutch means (40, 47) for transferring a reaction torque from said second planetary gear ring gear (22) to said housing (10) only as long as the reaction torque on said second planetary gear ring gear (22) does not exceed a limit value which is higher than said threshold level and which corresponds to a desired maximum torque to be delivered by the tool.

8. Tool according to claim 1, wherein said coupling means (37) comprises a friction element which in said high speed position of said first planetary gear ring gear (17) is clamped between said first planetary gear ring gear (17) and the planet wheel carrier (16) of said first planetary gear (13) and which in said low speed position of said first planetary gear ring gear (17) is clamped between said first planetary gear ring gear (17) and an element (27) which is non-rotatively supported in said housing (10).

9. Tool according to claim 8, wherein said element (27) is formed by a ring gear (27) of a third planetary gear (25) which is located between said first planetary gear (13) and said second planetary gear (19), and said ring gear (27) of said third planetary gear (25) being axially displaceable together with said second planetary gear ring gear (22) under the influence of said cam means (40, 41).

10. Tool according to claim 9, wherein said cam means (40, 41) comprises a release clutch means (40, 47) for transferring a reaction torque from said second planetary gear ring gear (22) to said housing (10) only as long as the reaction torque on said second planetary gar ring gear (22) does not exceed a limit value which is higher than said threshold level and which corresponds to a desired maximum torque to be delivered by the tool.

11. Tool according to claim 8, wherein said cam means (40, 41) comprises a release clutch means (40, 47) for transferring a reaction torque from said second planetary gear ring gear (22) to said housing (10) only as long as the reaction torque on said second planetary gear ring gear (22) does not exceed a limit value which is higher than said threshold level and which corresponds to a desired maximum torque to be delivered by the tool.

12. Tool according to claim 1, wherein said cam means (40, 41) comprises a release clutch means (40, 47) for transferring a reaction torque from said second planetary gear ring gear (22) to said housing (10) only as long as the reaction torque on said secondary planetary gear ring gear (22) does not exceed a limit value which is higher than said threshold level and which corresponds to a desired maximum torque to be delivered by the tool.

13. Tool according to claim 12, wherein said cam means (40, 41) comprises at least one axially directed shoulder (40) on said second planetary gear ring gear (22), and a cam following means (41) axially biassed by a second spring means (43) towards said second planetary gear ring gear (22), each of said shoulders (40) having a first inclined cam surface (46) for cooperation with said cam following means (41) at reaction torque values up to said threshold level and a second inclined cam surface (47) of a steeper inclination than said first cam surface (46) and arranged to cooperate with said cam following means (41) at reaction torque values between said threshold level and said limit value.

* * * * *